H. A. GSELL.
APPARATUS FOR PACKING MATCHES IN BOXES FOR MATCH MAKING MACHINES.
APPLICATION FILED JAN. 14, 1919.

1,378,784.

Patented May 17, 1921.

Inventor:
Henry Alfred Gsell,
By Henry Orth Jr.
Atty.

H. A. GSELL.
APPARATUS FOR PACKING MATCHES IN BOXES FOR MATCH MAKING MACHINES.
APPLICATION FILED JAN. 14, 1919.
1,378,784.
Patented May 17, 1921.
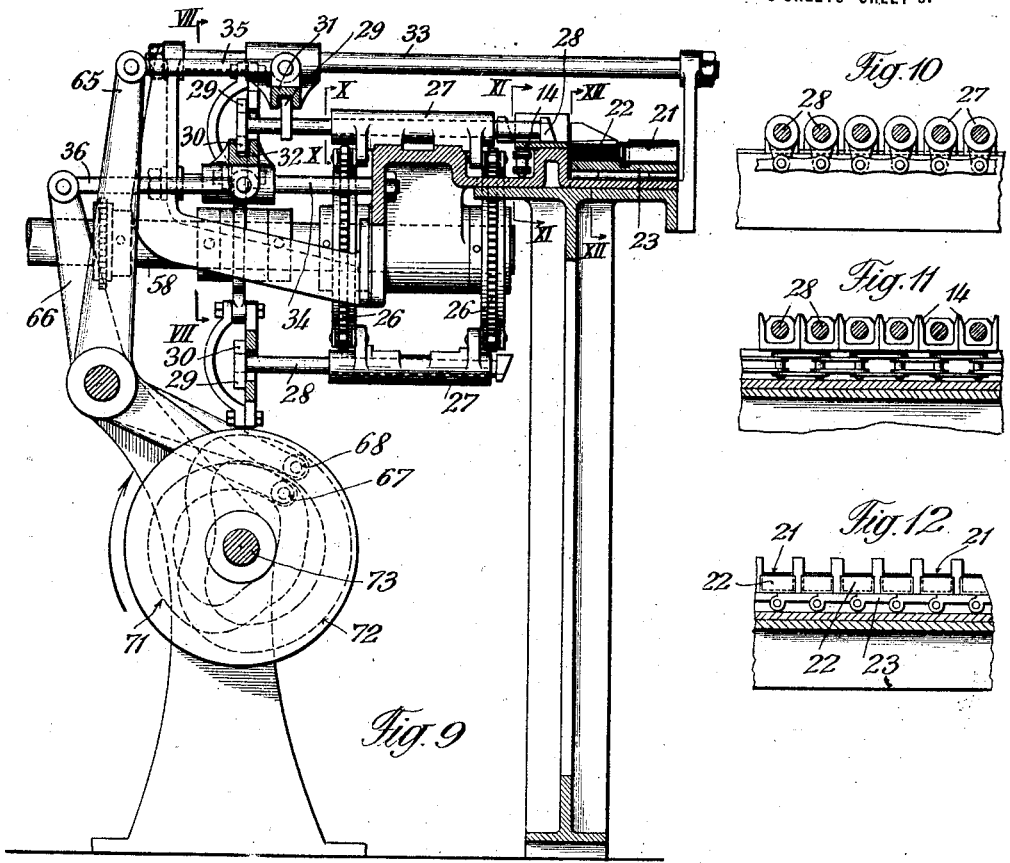
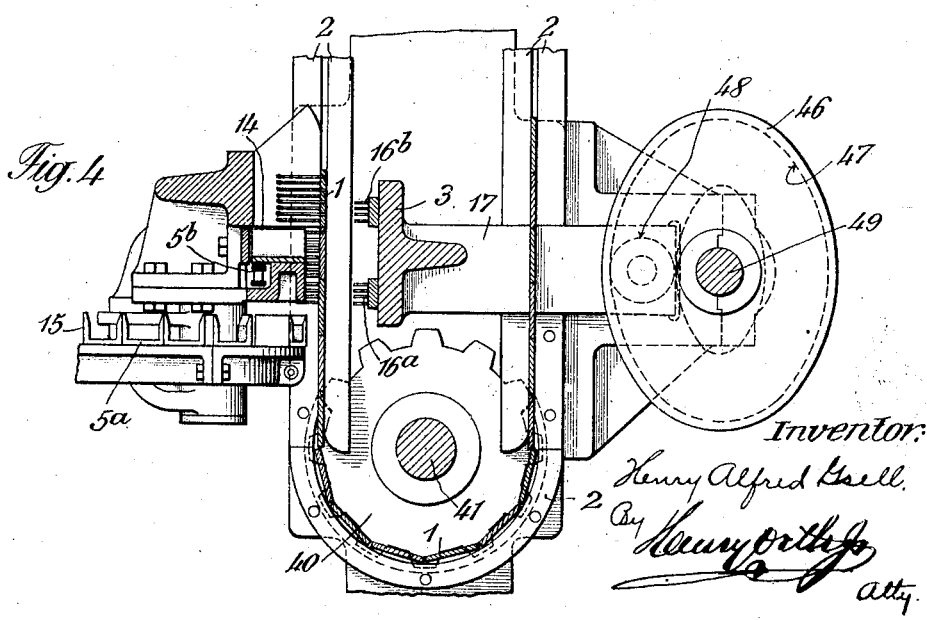

H. A. GSELL.
APPARATUS FOR PACKING MATCHES IN BOXES FOR MATCH MAKING MACHINES.
APPLICATION FILED JAN. 14, 1919.
1,378,784.
Patented May 17, 1921.
5 SHEETS—SHEET 4.
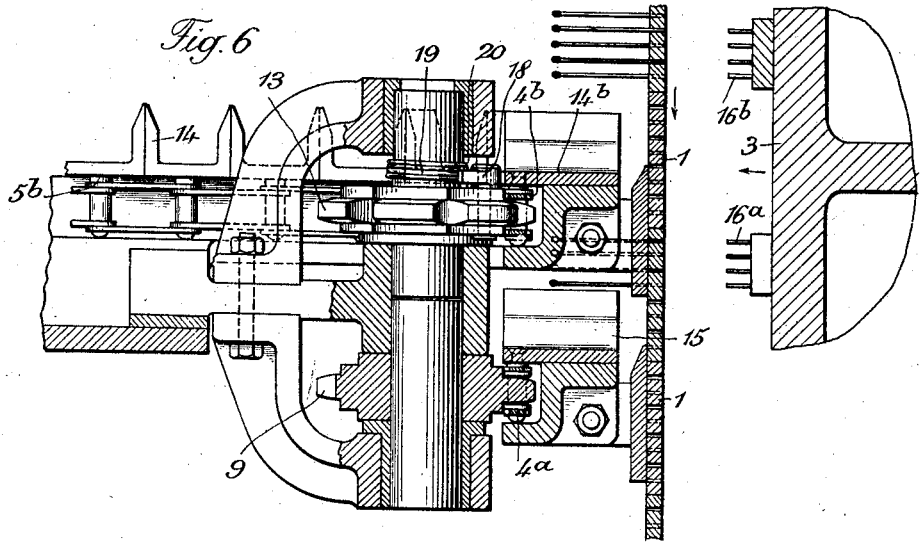
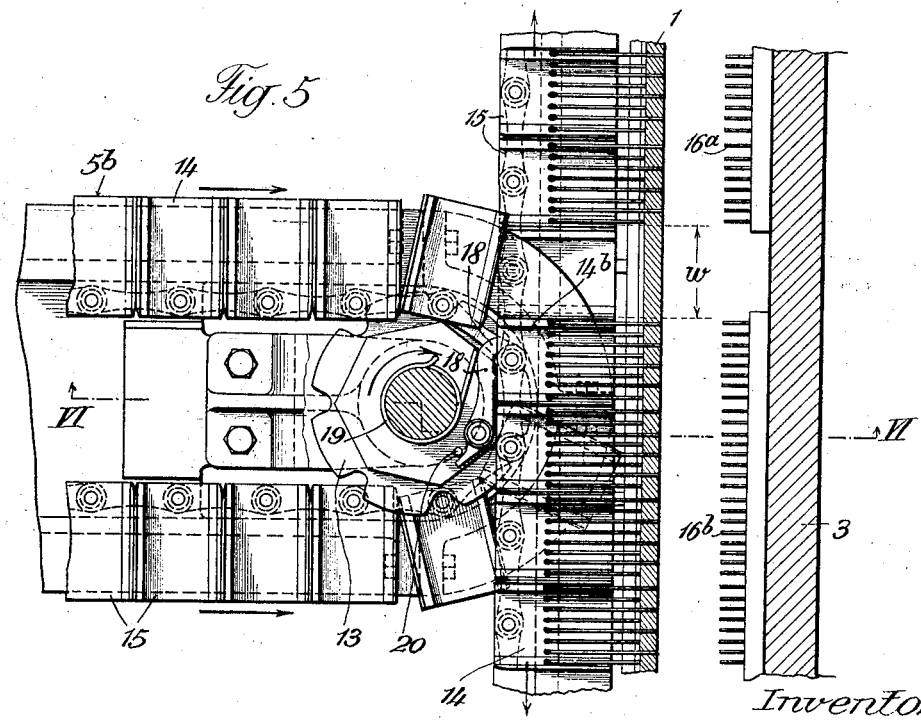

H. A. GSELL.
APPARATUS FOR PACKING MATCHES IN BOXES FOR MATCH MAKING MACHINES.
APPLICATION FILED JAN. 14, 1919.
1,378,784.
Patented May 17, 1921.
5 SHEETS—SHEET 5.
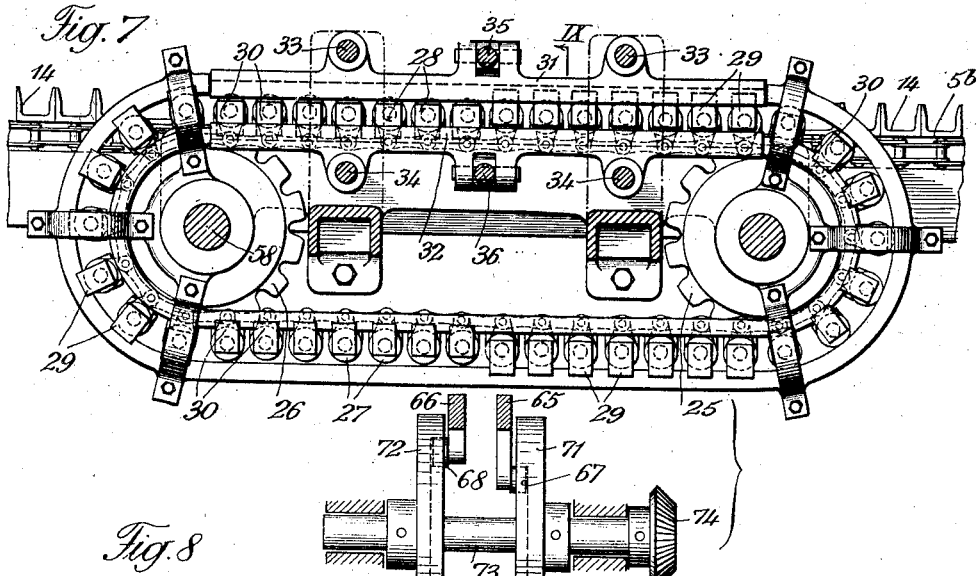
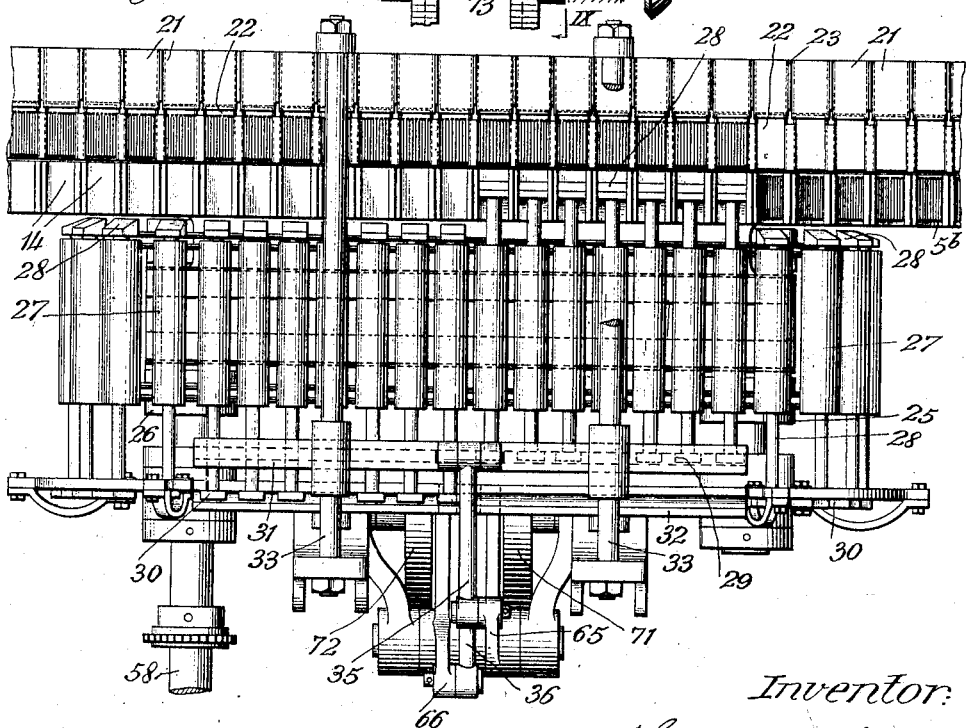

UNITED STATES PATENT OFFICE.

HENRY ALFRED GSELL, OF PARIS, FRANCE.

APPARATUS FOR PACKING MATCHES IN BOXES FOR MATCH-MAKING MACHINES.

1,378,784.     Specification of Letters Patent.     Patented May 17, 1921.

Application filed January 14, 1919. Serial No. 271,115.

*To all whom it may concern:*

Be it known that I, HENRY ALFRED GSELL, a citizen of the Republic of Switzerland, residing at Paris, 118 Boulevard Clichy, France, have invented certain new and useful Improvements in Apparatus for Packing Matches in Boxes for Match-Making Machines; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in apparatus for packing matches in boxes for match-making machines of the class in which the matches forced into carrier bars are saturated with paraffin, then dipped, dried and finally again ejected from said bars. In the apparatus for packing matches into boxes according to this invention the matches forced out of the carrier bars by an ejecting device are received at the place of ejection by a plurality of endless strips. Each of these strips moved parallel to the carrier bars while it is caused to travel past the latter serves for receiving only the matches ejected from a portion of the whole length of the carrier bars.

The reason for the unsatisfactory working of the hitherto proposed members for receiving the matches ejected from the carrier bars and moved parallel to the carrier bars, consisted in the difficulty of moving the strip serving for receiving the ejected matches between two succeeding ejection strokes in a sufficiently quick manner past the whole length of the carrier bars with regard to the velocity of the ejecting device. By distributing the movement to be carried out between two ejection periods over a plurality of strips adapted to receive the ejected matches, each of these strips has to be moved only during a portion of the span of time required when it would have to be moved forward to an amount corresponding to the whole length of the carrier bars.

One form of carrying the invention into effect is shown by way of example in the accompanying drawings, the parts of the match-making machine proper not necessary for the understanding of the invention being omitted.

Figure 3:
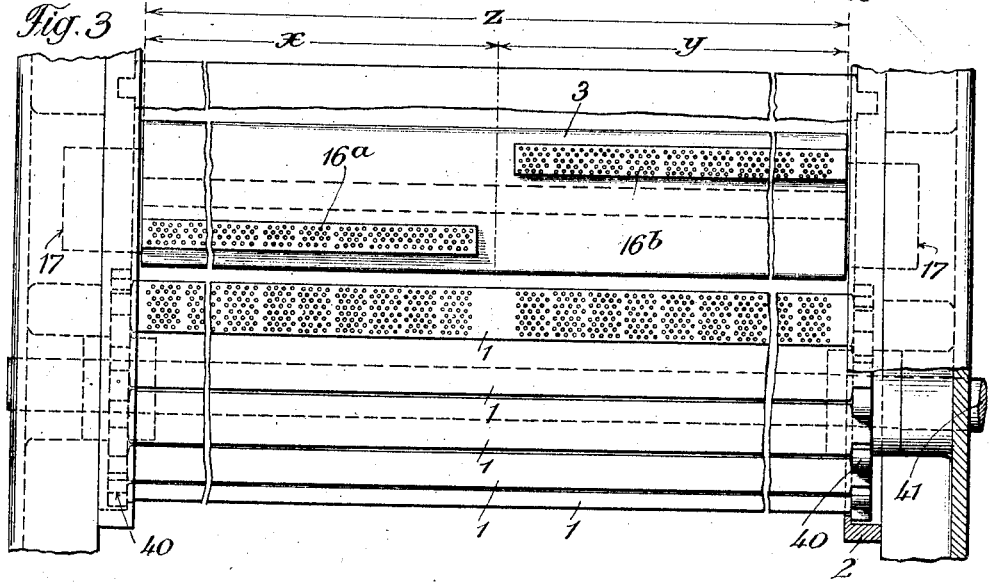
Fig. 3 is an enlarged front view of the ejecting beam.
Figure 3A:
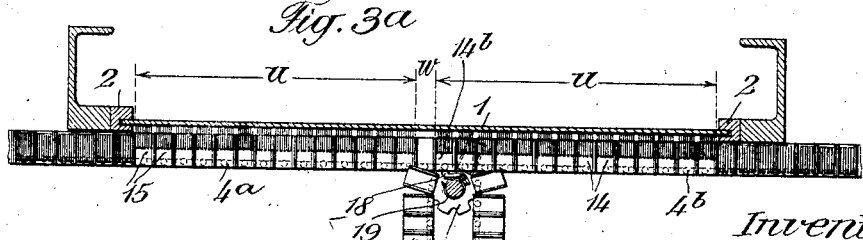
Figure 2:
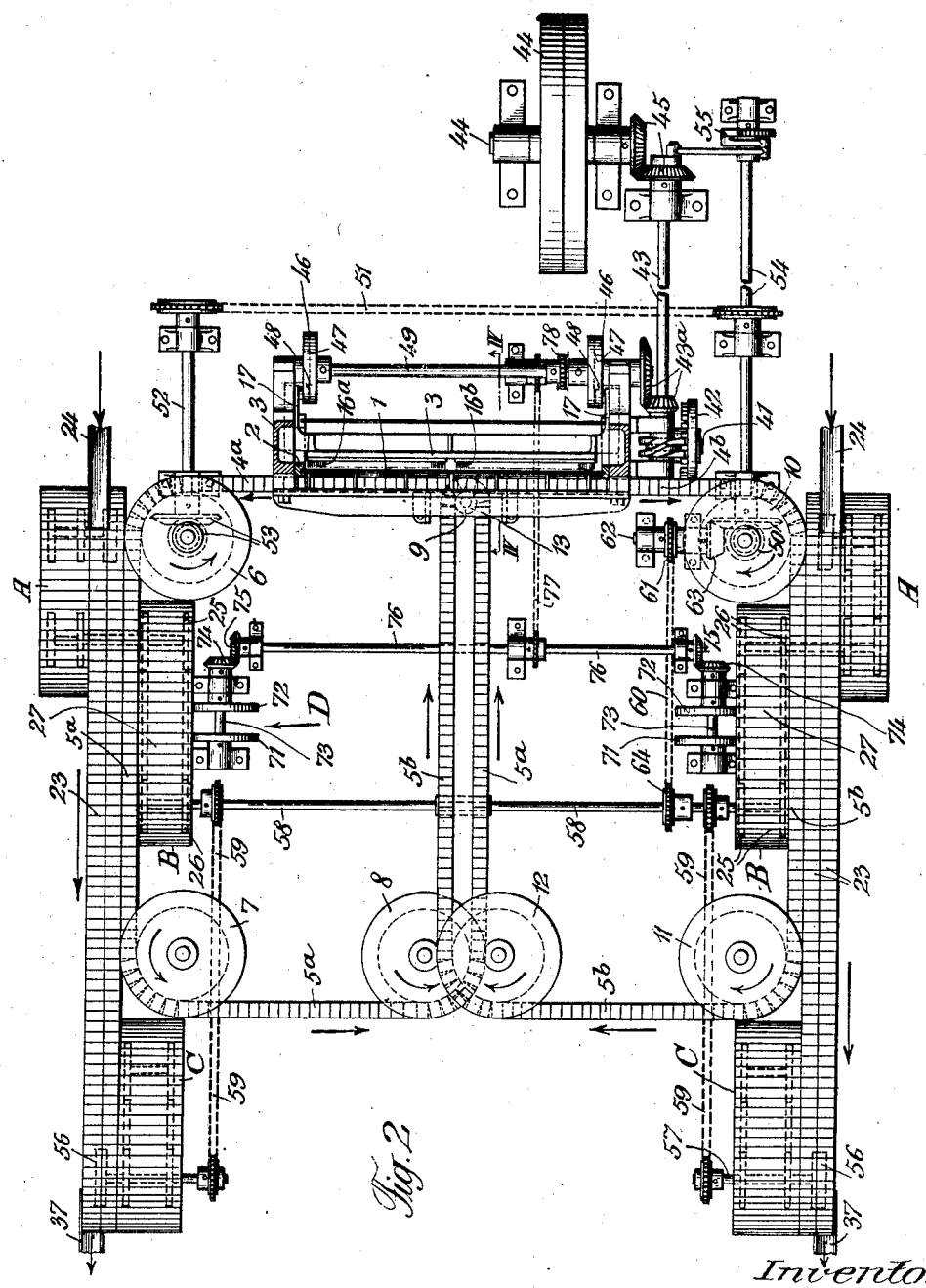
Fig. 2 is a plan view corresponding to Fig. 1 and illustrating diagrammatically some devices not shown in Fig. 1.

Fig. 3$^a$ shows a portion of Fig. 2 on an enlarged scale;

Fig. 4 is a section on the line IV—IV of Fig. 2;

Fig. 5 illustrates on an enlarged scale a portion of Fig. 2;

Fig. 6 is a section on the line VI—VI of Fig. 5;

Fig. 7 is partly an enlarged view seen in the direction of the arrow D of Fig. 2, of the device for forcing the matches into the inner boxes of the match boxes to be filled and partly a section on the line VII—VII of Fig. 9;

Fig. 8 is a plan view corresponding to Fig. 7;

Fig. 9 is a section on the line IX—IX of Fig. 7;

Fig. 10 is a section on the line X—X of Fig. 9;

Fig. 11 is a section on the line XI—XI of Fig. 9 and

Fig. 12 is a section on the line XII—XII of Fig. 9.

Referring to the drawings, 1 (Figs. 1, 2, 3, 4, 5, 6) denotes the carrier bars into which the matches are adapted to be forced. These carrier bars arranged on the ejection side at one end of a match-making machine are guided in members 2 and receive a step by step downward movement from sprocket wheels 40 (Figs. 3, 4), so as to permit an ejecting beam 3 to force the matches out of said bars and cause them to fall on two strips having the shape of endless chains 5$^a$ and 5$^b$. The wheels 40 are fixed to a shaft 41 to which is also fixed a wheel 42 (Figs. 1, 2) receiving an intermittent rotary movement from a shaft 43 driven in its turn by a main drive 44 (Fig. 2) through the medium of a bevel gearing 45. The ejecting beam 3 is reciprocated in time with the match-making machine by disks 46 (Figs. 2, 4) each provided with a groove 47. In these grooves travel rolls 48 provided on arms 17 of the beam 3. The disks 46 are mounted on a shaft 49 receiving a rotary movement from the shaft 43 through the medium of bevel wheels 43ª. The straight portions 4ª, 4ᵇ of the chains 5ª and 5ᵇ respectively, are moved parallel to the carrier bars 1 past the ejection side of the latter. The portion $u$ (Fig. 3ª) of each of the chains or strips 5ª and 5ᵇ respectively serving for receiving the ejected matches extends only over a portion of the whole length of the carrier bars 1. The chain 5ª passes over three larger wheels 6, 7, 8 (Fig. 2) and a smaller wheel 9, while the chain 5ᵇ arranged higher up passes over three larger wheels 10, 11, 12 and a smaller wheel 13. The chain 5ᵇ receives its movement from the wheel 10 operatively connected to a shaft 54 by means of a bevel wheel gearing 50, while the chain 5ª receives its movement from the wheel 6 operatively connected to a shaft 52 by means of a bevel wheel gearing 53, the rotary movement of the shaft 54 being transmitted to the shaft 52 by means of a chain 51. The shaft 54 receives an intermittent movement from the shaft 43 above referred to through the medium of a ratchet mechanism 55. The smaller wheels 9 and 13 are arranged coaxially (Fig. 6). 14 (Figs. 4, 5, 6) denotes cases of the chain 5ᵇ and 15 denotes cases of the chain 5ª receiving the ejected matches. As shown in Figs. 3, 4 and 6, the ejecting beam 3 comprises two sets of ejecting needles 16ª and 16ᵇ respectively, arranged in accordance with the superposed arrangement of the endless chains 5ª and 5ᵇ on different levels. During each forward stroke of the ejecting beam 3 some of the cases 14 of the chain portion 4ᵇ are filled with matches forced out by the ejecting needles 16ᵇ and some of the cases 15 of the chain portion 4ª with matches forced out by the ejecting needles 16ª. In order to bring in the described apparatus other cases 14 and 15 in front of the ejecting side of the carrier bars 1, said cases have not to be advanced each time to an amount $z$ (Fig. 3) corresponding to the whole length of the carrier bars 1, as is the case in the arrangements hitherto proposed, since this end is already attained by moving the cases 14 each time to an amount $y$ and the cases 15 to an amount $x$ (Fig. 3), so that the speed with which said endless chains have to be advanced each time can be chosen just half so great as in the known arrangements.

In order to prevent the formation of a too large gap (Fig. 5) on the small wheels 9 and 13 between the two sets of cases 14 and 15 that have to be filled simultaneously at the place where the portions of the endless chains 5ª and 5ᵇ situated at right angles to the carrier bars 1 pass into the portions 4ª and 4ᵇ respectively that are parallel to said bars 1, the wheel 13 comprises a device adapted to force that one of the pivotally mounted chain-cases situated just at the point of transition referred to, and which is the last one of the set of cases that have to be filled together, into a position in which it is parallel to the remaining cases to be filled. Figs. 5 and 6 show this device in connection with the wheel 13 and the chain case 14ᵇ. Sidewise on the wheel 13 carrying out one complete revolution during each step movement imparted to the chains is pivotally mounted a double armed lever 18. A spring 19 fixed at one end to the wheel 13 has the tendency to move the longer arm of the lever 18 outward and consequently toward the cases; a stop pin 20 limits the outward swing of the lever 18. At the end of a step movement imparted to the chains, the spring 19 is able to act however upon the case 14ᵇ that is situated just at the point of transition above mentioned, so that it moves said case into the position shown in Fig. 5, where it is parallel to the remaining six cases that have been moved into the position in which they are adapted to receive the ejected matches. In consequence of this, the case 14ᵇ referred to can also be filled with matches, and at the same time the gap $w$ between the two rows of cases to be filled simultaneously (and where no ejection can take place) is relatively small.

The portions of the chains 5ª and 5ᵇ leaving the wheels 6 and 10 (Fig. 1) respectively, move to the rear of the machine to the ejection places at the side. On both sides of said portions of the chains are disposed the devices for opening the match boxes to be filled, the devices for pushing the matches out of the chain cases into the match boxes and the devices for pushing the latter into the box cases, $i. e.$ for closing the match boxes.

Referring to Fig. 2, A shows diagrammatically the means for opening the match boxes, B the devices for pushing the matches into the match boxes and C. the devices for closing the match boxes. The devices A and C are of known design and operate in a known manner, so that they are illustrated only diagrammatically. The device B for pushing the matches into the match boxes had to be adapted, however, to the novel apparatus and is consequently illustrated separately in Figs. 7–12.

Figure 1:
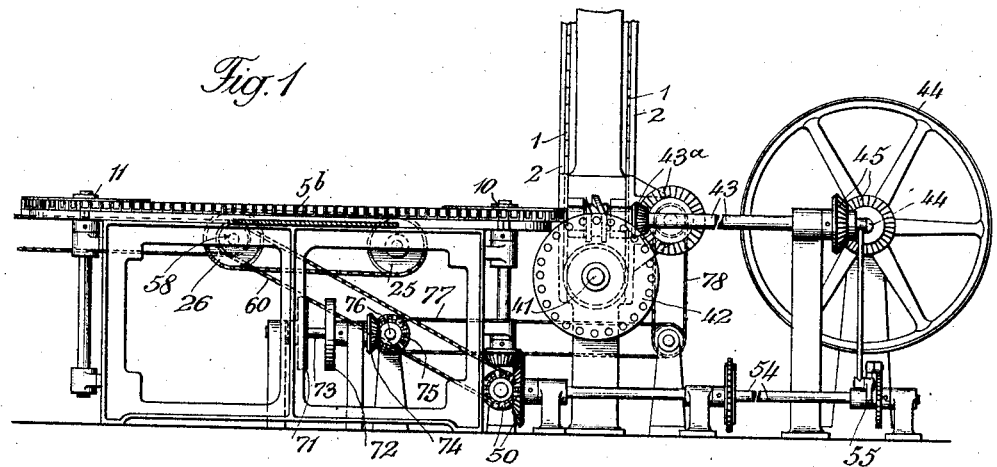
Figure 1 is a side view of the driving mechanism for the apparatus for packing the matches in boxes, illustrating also the adjacent parts of the match-making machine.

Referring to these Figs. 7–12, 21 denotes the match box cases, and 22 the boxes carried by special chains 23 (Fig. 12) arranged sidewise of the chains 5ª and 5ᵇ. The chains 23 are driven in unison with the chains 5ª and 5ᵇ by wheels 56, mounted on shafts 57 (Fig. 2). The shafts 57 receive their drive from a shaft 58 through the medium of chains 59. The shaft 58 is driven in its turn by a chain 60 passing over a wheel 64 mounted on this shaft and a wheel 61 mounted on the shaft 62 carrying a bevel wheel 63 which meshes with the bevel wheel 50 mounted on the shaft 54. 24 (Fig. 2) is the place where the closed match boxes are fed to the chains 23 in order that they may be opened afterward by the devices A. Each device B comprises a chain 27 (Figs. 9, 7, 10) passing over two wheels 25 and two wheels 26 and moved in unison with the chains 5ᵃ and 5ᵇ. To this end the wheels 26 are mounted on the shaft 58 (Fig. 1) carrying the wheel 64 over which passes the chain 60 already mentioned. In the links of the chain 27 are adjustably mounted plungers 28. Each set of seven plungers arranged side by side has upwardly extending projections 29 (Fig. 7, 9), while the two adjacent sets of seven plungers have downwardly extending projections 30. The projections 29 coöperate during a certain span of time with a rail 31 having a U-shaped cross-section (Fig. 9), and the projections 30 coöperate during a certain span of time with a rail 32 having a U-shaped cross-section. The rail 31 is adapted to be moved in a transverse direction on guides 33 by a rod 35, while the rail 32 is adapted to be moved to and fro in a transverse direction in guides 34 by a rod 36. The rod 35 is connected to a double armed lever 65 and the rod 36 to a double armed lever 66. The levers 65 and 66 carry rollers 67 and 68 respectively traveling each in a groove of disks 71 and 72 respectively (Figs. 1, 2, 7, 9). The latter are fixed to a shaft 73 carrying a bevel wheel 74 meshing with a bevel wheel 75 fixed to the shaft 76 operatively connected to the shaft 49 by means of chains 77, 78 (Figs. 1, 2). Owing to this arrangement, the matches are pushed during each working cycle of the machine out of seven cases 14 (Fig. 8), arranged side by side into seven match boxes 22, by seven plungers 28. The step by step feed movement to be imparted to the chains 5ᵃ and 5ᵇ respectively, takes place while the heads of seven plungers 28 of the devices B carry out their return stroke and while they are still projecting into the cases 14 and 15 of the chains 5ᵇ and 5ᵃ respectively. In consequence of this, the cases 14 and 15 of the chains 5ᵇ and 5ᵃ respectively, are always exactly opposite the plungers 28, so that the matches are not only filled at B in the proper manner into the match boxes, but the chain cases are also caused to assume their proper position relatively to the carrier bar 1, any play between the chain links being thereby compensated. The closing of the filled match boxes is effected in a known manner by the devices C, and the wholly filled closed match boxes pass then at 37 out of the machine.

Moreover, it is also possible to pack in such an apparatus automatically certain kinds of matches, for instance the so-called sesqui-sulfite matches, which—when any danger of explosion has to be avoided—can be packed into boxes only a certain span of time after their drying.

In the embodiment shown, each set of ejecting needles comprises four rows of needles, but it will be understood that also more or less than four such rows may be provided.

I claim—

1. In an apparatus for packing matches in boxes for match-making machines, movable carrier bars for the matches, means adapted to eject the matches from said bars, a plurality of endless members serving for receiving the matches ejected by said means from the carrier bars and each having a portion parallel to a portion of the length of the carrier bars, and means for moving the members past the carrier bars, each of said endless members being adapted to receive only matches ejected from a portion of the whole length of the carrier bars.

2. An apparatus for packing matches in boxes for match-making machines, comprising movable carrier bars for the matches, sets of means arranged on different levels for ejecting the matches from said bars, a plurality of endless members also arranged on different levels and serving for receiving the matches ejected by said means from the carrier bars, each of said members having a portion parallel to the carrier bars and each of said sets of ejecting means being adapted to coöperate with one of the endless members, and means for moving the endless members past the carrier bars, each of said members being adapted to receive matches ejected only from a portion of the whole length of the carrier bars.

3. An apparatus for packing matches in boxes for match-making machines, comprising movable carrier bars for the matches, an ejecting beam arranged sidewise of said bars, means for imparting to said beam a to and fro movement, groups of ejecting needles carried by said beam and arranged on different levels thereon, a plurality of endless strips also arranged on different levels and serving for receiving the matches ejected by said needles from the carrier bars, each of said strips having a portion parallel to the carrier bars, and means for moving the strips past the carrier bars, each of said strips being adapted to receive matches ejected only from a portion of the whole length of the carrier bars.

4. An apparatus for packing matches in boxes for match-making machines, comprising movable carrier bars for the matches, means adapted to eject the matches from said bars, a plurality of endless chains serving for receiving the matches ejected by said means from the carrier bars, guide wheels for said endless chains adapted to guide each of the latter so that a portion of it is parallel to a portion of the length of the carrier bars, and means causing said endless chains to travel past the carrier bars, each endless chain being adapted to receive matches ejected only from a portion of the whole length of the carrier bars.

5. An apparatus for packing matches in boxes for match-making machines, comprising movable carrier bars for the matches, means adapted to eject the matches from said bars, two endless chains serving for receiving the matches ejected by said means from the carrier bars, guide-wheels for said endless chains adapted to guide each of the latter so that a portion of it is parallel to the carrier bars, two of said wheels arranged in the middle of the ejecting front and coöperating with different chains being arranged coaxially one upon another, and means causing said endless chains to travel past the carrier bars, each endless chain being adapted to receive matches ejected only from a portion of the whole length of the carrier bars.

6. An apparatus for packing matches in boxes for match-making machines, comprising movable carrier bars for the matches, means adapted to eject the matches from said bars, two endless chains, cases serving for receiving the matches ejected by said means from the carrier bars pivotally mounted on said chains, guide wheels for the endless chains adapted to guide each of the latter so that a portion of it is parallel to the carrier bars, two of said wheels arranged in the middle of the ejecting front and coöperating with different chains being arranged coaxially one upon another, means on one of the last mentioned two wheels adapted to rotate the cases pivotally mounted on the chain passing over said wheel into a parallel position relatively to the carrier bars, and means causing said endless chains to travel past the carrier bars, each endless chain being adapted to receive matches ejected only from a portion of the whole length of the carrier bars.

7. An apparatus for packing matches in boxes for match-making machines, comprising movable carrier bars for the matches, means adapted to eject the matches from said carrier bars, endless chains, cases serving for receiving the matches ejected by said means from the carrier bars pivotally mounted on said chains, guide wheels for the endless chains adapted to guide each of the latter so that a portion of it is parallel to the carrier bars, a group of endless members having a portion parallel to said endless chains, plungers carried by said group of endless members adapted to push the matches from said pivotally mounted cases into the match boxes to be filled, and a common drive for the endless chains and the members adapted to move them in unison, each of the endless case chains caused to move by said drive past the carrier bars being adapted to receive only the matches ejected from a portion of the whole length of the carrier bars, and said plungers extending, while the endless members are moved, into cases of the endless chains in order to secure the proper relative position between said endless chains and the group of endless members carrying said plungers.

8. An apparatus for packing matches in boxes for match-making machines, comprising movable carrier bars for the matches, means adapted to eject the matches from said carrier bars, endless chains, cases serving for receiving the matches ejected by said means from the carrier bars pivotally mounted on said chains, guide wheels for the endless chains adapted to guide each of the latter so that a portion of it is parallel to the carrier bars, a group of endless members having a portion parallel to said endless chains, a second group of endless members carrying the match boxes to be filled, plungers carried by said first group of endless members adapted to push the matches from said pivotally mounted cases into the match boxes to be filled and a common drive for the endless chains and the two groups of endless members adapted to move them in unison, each of the endless case chains caused to move by said drive past the carrier bars being adapted to reecive matches ejected only from a portion of the whole length of the carrier bars, and said plungers extending, while the endless members are moved, into cases of the endless chains in order to secure the proper relative position between the endless chains and the group of endless members carrying said plungers.

9. An apparatus for packing matches in boxes for match making machines, comprising movable carrier bars for the matches, means adapted to eject the matches from said carrier bars, a first set of endless chains, cases serving for receiving the matches ejected by said means from the carrier bars pivotally mounted on said chains, guide wheels for said endless chains adapted to guide each of the latter so that a portion of it is parallel to the carrier bars, a second set of endless chains having a portion parallel to said endless case chains, a third set of endless chains carrying the match boxes to be filled, plungers carried by the second set of endless chains adapted to push the matches from said pivotally mounted cases into the match boxes to be filled, and a common drive for all said sets of endless chains adapted to move them in unison, each of the endless case chains caused to move by said drive past the carrier bars being adapted to receive only the matches ejected from a portion of the whole length of the carrier bars, and said plungers extending, while the endless chains of the second set are moved, into the cases of the first set of endless chains in order to secure the proper relative position between said first set of endless chains and the set of endless chains carrying said plungers.

10. In a match boxing machine, movable match carrying bars, match ejectors coöperating with said bars, a plurality of endless chains each having a portion parallel to a different portion of the length of a carrier bar, whereby each chain will receive matches from a different portion of the length of said bar.

In testimony that I claim the foregoing as my invention, I have signed my name.

HENRY ALFRED GSELL.

Witness:
JOHN F. SIMONS.